UNITED STATES PATENT OFFICE.

LEOPOLD HESSE AND OSCAR GÜNTHER, OF ELBERFELD, AND ARTHUR ZART, OF VOH-WINKEL, NEAR ELBERFELD, GERMANY, ASSIGNORS TO FARBENFABRIKEN VORM. FRIEDR. BAYER & CO., OF ELBERFELD, GERMANY, A CORPORATION OF GERMANY.

AZO DYE.

933,447.  Specification of Letters Patent.  Patented Sept. 7, 1909.

No Drawing.  Application filed April 8, 1909. Serial No. 488,697.

*To all whom it may concern:*

Be it known that we, LEOPOLD HESSE, OSCAR GÜNTHER, and ARTHUR ZART, doctors of philosophy, chemists, citizens of the German Empire, residing at, respectively, Elberfeld, Elberfeld, and Vohwinkel, near Elberfeld, Kingdom of Prussia, have invented new and useful Improvements in New Azo Coloring-Matter, of which the following is a specification.

Our present invention relates to the manufacture and production of new secondary disazo dyestuffs dyeing cotton from red to blue shades which are remarkable for their extraordinary fastness to light.

The new dyes are obtained by first producing intermediate compounds (aminoazo compounds) from diazotized naphthylamin compounds, especially naphthylamin sulfonic acid and aminonaphthol sulfonic acids which contain a sulfonic group in ortho-position, to the amino-group, especially in alpha-beta and in beta-alpha-position and suitable amins, then diazotizing these intermediate products and combining the thus produced diazoazo compounds with 2-amino-5-naphthol-7-sulfonic acid and its alkylated or arylated derivatives and their derivatives substituted in ortho-position to the amino-group *e. g.* the 2-amino-5-naphthol-1.7-disulfonic acid, the thiazol derivatives of the 2-amino-5-naphthol-7-sulfonic acid (see United States Letters Patent 795869) or the imidazol derivatives of 2-amino-5-naphthol-7-sulfonic acid (see United States Letters Patent 792600,) the carbonyl-1.2-diamino-5-naphthol-7-sulfonic acid.

To produce the aminoazo compounds from diazo compounds which combine only with difficulty one can make use of the process described in British Letters Patent 11343 of 1899.

The new dyestuffs are in the shape of their alkaline salts dark powders easily soluble in water, soluble in concentrated sulfuric acid with from a violet to blue color. Upon reduction with stannous chlorid and hydrochloric acid the dyestuffs are decomposed, an ortho-substituted naphthylamin, a diamin and a derivative of a 2.6-diamino-5-naphthol compound having the formula:

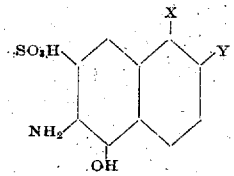

(X meaning hydrogen or $SO_3H$, Y meaning $NH_2$ or a substituted amino-group), X and Y can also form together a group, such as

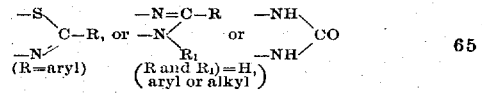

are formed.

In order to carry out this process we can *e. g.* proceed as follows, the parts being by weight: 303 parts of alpha-naphthylamin-2.4-disulfonic acid are diazotized with 69 parts of sodium nitrite and the necessary quantity of hydrochloric acid and the diazo compound thus produced is then combined with 156.5 parts of para-xylidin hydrochlorid in the usual way with the addition of sodium acetate, the intermediate compound is redissolved in water and is then rediazotized at 15—20° C., the diazo compound is salted out and filtered off. It is then stirred up with water to a paste and is added to a solution of 315 parts of 2-phenylamino-5-naphthol-7-sulfonic acid containing an excess of sodium carbonate. The dyestuff is then isolated in the usual way. It is after being dried and pulverized in the shape of its sodium salt a dark green powder soluble in water with a violet-red color and soluble in concentrated sulfuric acid with a blue-green color. By reduction with stannous chlorid and hydrochloric acid the dye is decomposed 1-naphthylamin-2.4-disulfonic acid, 2.5-dimethyl-1.4-diaminobenzene and 2-phenylamino-5-oxy-6-aminonaphthalene-7-sulfonic acid are formed. It dyes cotton fast violet shades.

The process is carried out in an analogous manner on starting from other of the above mentioned nephthalene derivatives, such as 1.5-aminonaphthol-2.7-disulfonic acid etc., other suitable amins as middle components and other of the above mentioned end components.

We claim:

1. The herein described new azo dyestuffs obtainable by combining the diazo compounds of aminoazo compounds which contain in the first component being a naphthalene derivative, a negative group in ortho-position to the amino-group with the hereinbefore defined 2-amino-5-naphthol compounds, which dyestuffs are, after being dried and pulverized, in the shape of their alkaline salts dark powders soluble in water, soluble in concentrated sulfuric acid with from a violet to blue color; yielding upon reduction with stannous chlorid and hydrochloric acid an ortho-substituted naphthylamin, a diamin and a derivative of a 2.6-diamino-5-naphthol compound of the above given formula; and dyeing cotton from red to blue shades, substantially as described.

2. The herein described new azo dyestuff which can be obtained from 1-naphthlyamin-2.4-disulfonic acid, para-xylidin and 2-phenylamino-5-naphthol-7-sulfonic acid, which dyestuff is, after being dried and pulverized, in the shape of its sodium salt a dark powder which is soluble in water with a violet-red color and which is soluble in concentrated sulfuric acid with a blue-green color; yielding upon reduction with stannous chlorid and hydrochloric acid 1-naphthylamin-2.4-disulfonic acid, 2.5-dimethyl-1.4-diaminobenzene and 2-phenylamino-6-amino-5-naphthol-7-sulfonic acid; and dyeing cotton violet shades, substantially as described.

In testimony whereof we have hereunto set our hands in the presence of two subscribing witnesses.

LEOPOLD HESSE. [L. S.]
OSCAR GÜNTHER. [L. S.]
ARTHUR ZART. [L. S.]

Witnesses:
OTTO KÖNIG,
C. J. WRIGHT.

---

It is hereby certified that in Letters Patent No. 933,447, granted September 7, 1909, upon the application of Leopold Hesse and Oscar Günther, of Elberfeld, and Arthur Zart, of Vohwinkel, near Elberfeld, Germany, for an improvement in "Azo Dyes," errors appear in the printed specification requiring correction as follows: Page 1, line 67, (line 4 of the formula,) after the symbol "$R_1$," the parenthesis should be stricken out, and page 2, line 2, the word "nephthalene" should read *naphthalene;* and that the said Letters Patent should be read with these corrections therein that the same may conform to the record of the case in the Patent Office.

Signed and sealed this 2nd day of November, A. D., 1909.

[SEAL.]

C. C. BILLINGS,

*Acting Commissioner of Patents.* manner on starting from other of the above mentioned nephthalene derivatives, such as 1.5-aminonaphthol-2.7-disulfonic acid etc., other suitable amins as middle components and other of the above mentioned end components.

We claim:

1. The herein described new azo dyestuffs obtainable by combining the diazo compounds of aminoazo compounds which contain in the first component being a naphthalene derivative, a negative group in ortho-position to the amino-group with the hereinbefore defined 2-amino-5-naphthol compounds, which dyestuffs are, after being dried and pulverized, in the shape of their alkaline salts dark powders soluble in water, soluble in concentrated sulfuric acid with from a violet to blue color; yielding upon reduction with stannous chlorid and hydrochloric acid an ortho-substituted naphthylamin, a diamin and a derivative of a 2.6-diamino-5-naphthol compound of the above given formula; and dyeing cotton from red to blue shades, substantially as described.

2. The herein described new azo dyestuff which can be obtained from 1-naphthlyamin-2.4-disulfonic acid, para-xylidin and 2-phenylamino-5-naphthol-7-sulfonic acid, which dyestuff is, after being dried and pulverized, in the shape of its sodium salt a dark powder which is soluble in water with a violet-red color and which is soluble in concentrated sulfuric acid with a blue-green color; yielding upon reduction with stannous chlorid and hydrochloric acid 1-naphthylamin-2.4-disulfonic acid, 2.5-dimethyl-1.4-diaminobenzene and 2-phenylamino-6-amino-5-naphthol-7-sulfonic acid; and dyeing cotton violet shades, substantially as described.

In testimony whereof we have hereunto set our hands in the presence of two subscribing witnesses.

LEOPOLD HESSE. [L. S.]
OSCAR GÜNTHER. [L. S.]
ARTHUR ZART. [L. S.]

Witnesses:
OTTO KÖNIG,
C. J. WRIGHT.

---

It is hereby certified that in Letters Patent No. 933,447, granted September 7, 1909, upon the application of Leopold Hesse and Oscar Günther, of Elberfeld, and Arthur Zart, of Vohwinkel, near Elberfeld, Germany, for an improvement in "Azo Dyes," errors appear in the printed specification requiring correction as follows: Page 1, line 67, (line 4 of the formula,) after the symbol "$R_1$," the parenthesis should be stricken out, and page 2, line 2, the word "nephthalene" should read *naphthalene;* and that the said Letters Patent should be read with these corrections therein that the same may conform to the record of the case in the Patent Office.

Signed and sealed this 2nd day of November, A. D., 1909.

[SEAL.]

C. C. BILLINGS,

*Acting Commissioner of Patents.*

It is hereby certified that in Letters Patent No. 933,447, granted September 7, 1909, upon the application of Leopold Hesse and Oscar Günther, of Elberfeld, and Arthur Zart, of Vohwinkel, near Elberfeld, Germany, for an improvement in "Azo Dyes," errors appear in the printed specification requiring correction as follows: Page 1, line 67, (line 4 of the formula.) after the symbol "R," the parenthesis should be stricken out, and page 2, line 2, the word "nephthalene" should read *naphthalene;* and that the said Letters Patent should be read with these corrections therein that the same may conform to the record of the case in the Patent Office.

Signed and sealed this 2nd day of November, A. D., 1909.

[SEAL.]

C. C. BILLINGS,
*Acting Commissioner of Patents.*